US012737164B2

(12) United States Patent
Buban et al.

(10) Patent No.: US 12,737,164 B2

(45) Date of Patent: Sep. 15, 2026

(54) CROSS-PLATFORM MUTUAL EXCLUSION

(71) Applicant: Microsoft Technology Licensing, LLC, Redmond, WA (US)

(72) Inventors: Garret Buban, Snoqualmie, WA (US); Madhav Himanshubhai Pandya, Redmond, WA (US); David Marion Hattaway, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 281 days.

(21) Appl. No.: 18/663,245

(22) Filed: May 14, 2024

(65) Prior Publication Data

US 2025/0355652 A1 Nov. 20, 2025

(51) Int. Cl.

| | |
|---|---|
| ***G06F 8/41*** | (2018.01) |
| ***G06F 9/48*** | (2006.01) |
| ***G06F 9/52*** | (2006.01) |

(52) U.S. Cl.

CPC ............ *G06F 8/447* (2013.01); *G06F 9/4881* (2013.01); *G06F 9/526* (2013.01)

(58) Field of Classification Search

None

See application file for complete search history.

(56) References Cited

U.S. PATENT DOCUMENTS

| | | | | |
|---|---|---|---|---|
| 9,977,673 | B1 | 5/2018 | Friedkin | |
| 2004/0113940 | A1* | 6/2004 | Brockway | G06F 21/604 715/741 |
| 2013/0036409 | A1* | 2/2013 | Auerbach | G06F 8/456 717/140 |
| 2015/0205646 | A1* | 7/2015 | Singh | G06F 9/526 718/106 |
| 2023/0086877 | A1* | 3/2023 | Hoste | G06F 9/45516 717/148 |
| 2024/0378790 | A1* | 11/2024 | Ashkar | G06T 15/005 |

OTHER PUBLICATIONS

Lindgren et al., "RTFM-core: Language and Implementation," IEEE, 2015. (Year: 2015).*

Weissman, Boris, "Active Threads: an Extensible and Portable Light-Weight Thread System," ICSI, 1997. (Year: 1997).*

(Continued)

*Primary Examiner* — Ryan D. Coyer

(57) ABSTRACT

Systems, methods, apparatuses, and computer program products are disclosed for generating, from platform-agnostic source code, platform-specific code to efficiently implement mutual exclusion. Platform-agnostic source code includes a first block of code associated with a first implementation-agnostic context that is structured to cause instances of the first block of code to execute in isolation from other instances of code associated with the first implementation-agnostic context. A mutual exclusion implementation is determined for efficient implementation of mutual exclusion on a target platform. Platform-specific code is generated for the target platform to execute instances of the first block of code in isolation from other instances of code associated with the first implementation-agnostic context based on the determined mutual exclusion implementation.

20 Claims, 6 Drawing Sheets

300

302 — Receive platform-agnostic source code of an application, the platform-agnostic source code comprising a first block of code associated with a first implementation-agnostic context structured to cause instances of the first block of code to execute in isolation from other instances of code associated with the first implementation-agnostic context 304 — Determine a target platform that will execute the application 306 — Determine a mutual exclusion implementation for the target platform 308 — Generate, based on the determined mutual exclusion implementation, platform-specific code to execute instances of the first block of code in isolation from other instances of code associated with the first implementation-agnostic context

(56) References Cited

OTHER PUBLICATIONS

Weisman et al., Efficient Fine-Grain Thread Migration with Active Threads, IEEE, 1998. (Year: 1998).*
Wimmer et al., "Maxine: An approachable virtual machine for, and in, java," ACM, 2013. (Year: 2013).*
The extended European search report Received for European Application No. 25174471.0, mailed on Oct. 8, 2025, 13 pages.
Communication pursuant to Article 94(3) EPC received for EP Application No. 25174471.0, mailed on Feb. 23, 2026, 06 pages.
Buban, et al., "Abstraction of Mutual Exclusion for Cross-Platform Efficiencies", Feb. 7, 2024, 2 pages.

* cited by examiner

CROSS-PLATFORM MUTUAL EXCLUSION

BACKGROUND

Cross-platform frameworks enable developers to build applications that can run on multiple operating systems and/or platforms using a single version of source code. These frameworks streamline the software development process by abstracting the differences between various platforms, allowing software developers to write code once and deploy it across multiple platforms without significant platform-specific modifications.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Systems, methods, apparatuses, and computer program products are disclosed for generating, from platform-agnostic source code, platform-specific code to efficiently implement mutual exclusion. Platform-agnostic source code includes a first block of code associated with a first implementation-agnostic context that is structured to cause instances of the first block of code to execute in isolation from other instances of code associated with the first implementation-agnostic context. A mutual exclusion implementation is determined for efficient implementation of mutual exclusion on a target platform. Platform-specific code is generated for the target platform to execute instances of the first block of code in isolation from other instances of code associated with the first implementation-agnostic context based on the determined mutual exclusion implementation.

Further features and advantages of the embodiments, as well as the structure and operation of various embodiments, are described in detail below with reference to the accompanying drawings. It is noted that the claimed subject matter is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
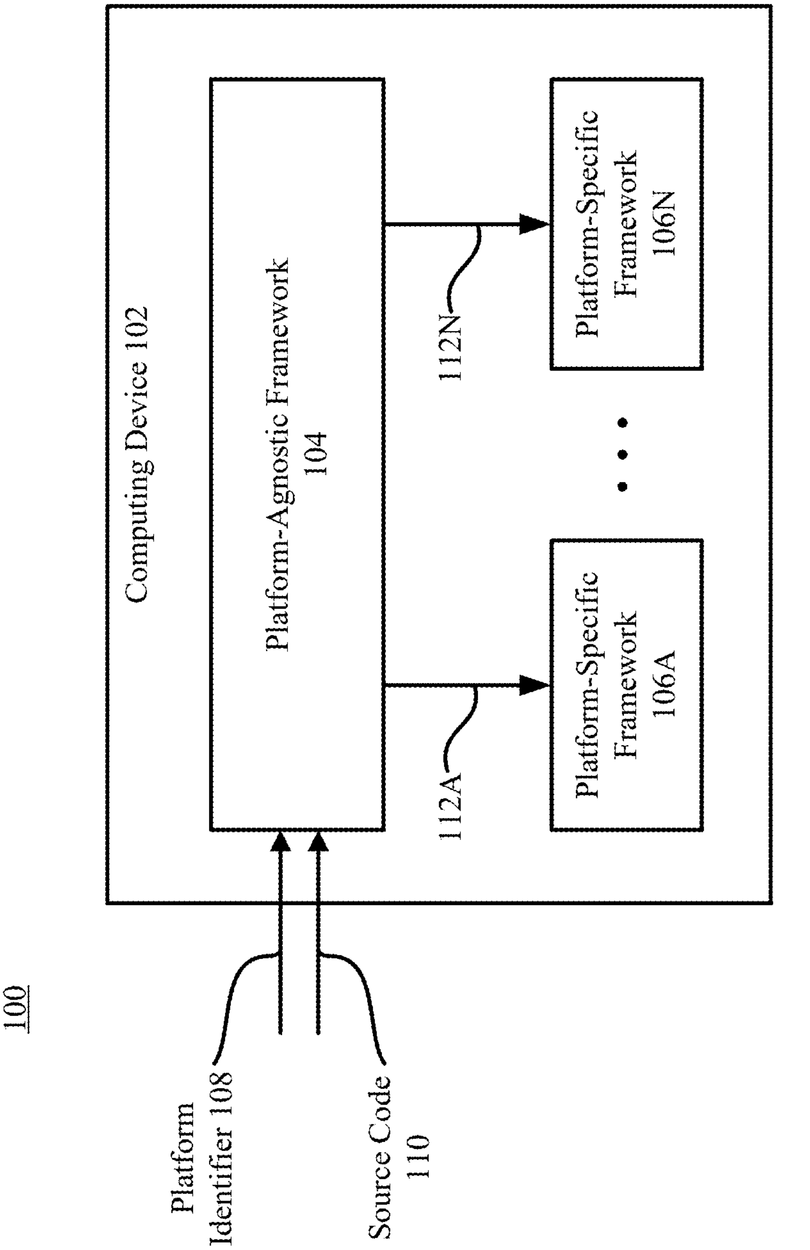
FIG. 1 shows a block diagram of an example system for generating, based on platform-agnostic source code, platform-specific code to efficiently implement mutual exclusion on a specific platform, in accordance with an embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

As used herein, the term "framework" refers to a set of software development tools that provide a foundation for building software applications, and typically includes components such as, but not limited to, libraries, APIs (Application Programming Interfaces), and/or reusable components that help developers implement common functionalities and solve specific problems more efficiently. In embodiments, frameworks abstract away low-level tasks, such as, but not limited to, handling network communication, user interface rendering, and/or database interaction, allowing developers to focus on application logic and higher-level features.

As used herein, the term "platform" refers to a combination of hardware and software components that provide a foundation for running applications. A platform encompasses the underlying hardware architecture (e.g., CPUs, GPUs, memory, storage devices, etc.) and the software environment (e.g., operating systems, runtime libraries, programming languages, development tools, etc.) that support the execution of software applications.

As used herein, the term "mutual exclusion" refers to a concept in concurrent programming where only one entity (e.g., process, thread, user, etc.) can access a shared resource (e.g., data, variable, file, etc.) and/or execute a critical section of code at any given time.

II. Example Embodiments

In today's digital landscape, applications are expected to run on a diverse set of devices, operating systems, and/or platforms. Building and/or maintaining separate codebases (e.g., source code) for each platform can be a time-consuming, resource-intensive process. Cross-platform frameworks address this challenge by enabling developers to write code once and deploy it across multiple platforms. By abstracting away platform-specific complexities, cross-platform frameworks empower developers to create applications that reach a broader audience, and deliver a consistent user experience across various devices, operating systems, and/or platforms. Additionally, developing code using cross-platform frameworks can lead to cost savings, as it requires fewer resources compared to maintaining separate native codebases for each platform.

Multi-threaded applications are software programs designed to execute multiple threads concurrently, where the multiple threads represent separate flows of execution, capable of performing tasks independently and asynchronously. In contrast to single-threaded programs, where tasks are executed sequentially, multi-threaded applications can utilize available processing resources more efficiently and can improve performance. Since threads in a multi-threaded application share the same memory space, multiple threads may attempt to access or modify shared resources simultaneously, leading to race conditions, data corruption, and/or other concurrency-related issues. To mitigate these issues, multi-threaded applications often employ synchronization mechanisms, such as, but not limited to, locks, semaphores, atomic operations, isolated scheduling, and/or the like, to enforce mutual exclusion and ensure that only one thread accesses a shared resource at a time.

In embodiments, platform differences can affect performance of multi-threaded application generated from a common codebase. For instance, a multi-threaded application executes more efficiently on a particular platform based on how mutual exclusion is implemented in the source code. Embodiments disclosed herein are directed to efficient cross-platform implementation of mutual exclusion using a cross-platform framework that provides an implementation-agnostic context that abstracts away mutual exclusion implementation from the developer.

In embodiments, an implementation-agnostic context enables a developer to write source code that employs mutual exclusion without worrying about how mutual exclusion is implemented. For instance, by associating a block of code with a particular implementation-agnostic context, a developer can ensure that any instance of the block of code will execute in isolation from other instances of code associated with the same implementation-agnostic context. In embodiments, the implementation agnostic context is a serialization context that enables sharing of information between instances of code associated with the serialization context.

In embodiments, the source code comprises a method to initialize one or more implementation-agnostic contexts in an application. For instance, the following pseudocode initializes an implementation-agnostic contexts (e.g., Context A) by calling the method InitializeContext( ):

```
Context A = InitializeContext( );
```

Once an implementation-agnostic context has been initialized, in embodiments, blocks of code can be associated with the initialized context to ensure that blocks of code associated with the same implementation-agnostic context must execute in isolation. For instance, a developer can associate critical sections of code with an implementation-agnostic context to prevent concurrent access to shared resources. As an example, the following pseudocode associates a block of code (e.g., a critical section of code) with an initialized context (e.g., Context A):

```
Isolate(A){
   [critical section of code];
}
```

In embodiments, a platform-agnostic framework analyzes source code to determine a first block code associated with an implementation-agnostic context, and determines a mutual exclusion implementation for a target platform. The platform-agnostic framework then, in embodiments, generates platform-specific code (e.g., platform-specific source code, etc.) to execute the first block of code using the determined mutual exclusion implementation. In embodiments, the platform-agnostic framework provides the generated platform-specific code to a platform-specific framework associated with the target platform to enable the platform-specific framework to compile the platform-specific code for execution on a device of the target platform. In a similar manner, the platform-agnostic framework, in embodiments, generates a plurality of platform-specific code for a plurality of platforms, and provides the plurality of platform-specific code to corresponding platform-specific frameworks to enable the plurality of platform-specific frameworks to compile the plurality of platform-specific code for execution on devices of the plurality of platforms.

The platform-agnostic framework determines a mutual exclusion implementation for a target platform in various ways, such as, but not limited to, based on input from subject matter experts familiar with platform-specific benefits associated with various mutual exclusion implementations, based on analysis of platform-specific historical performance data associated with various mutual exclusion implementations, and/or the like. In embodiments, the platform-agnostic framework implements a first mutual exclusion implementation for a first target platform by generating platform-specific code to employ a lock to ensure isolated execution of blocks of source code associated with an implementation-agnostic context. In embodiments, the platform-agnostic framework implements a second mutual exclusion implementation for a second target platform by generating platform-specific code to schedule execution of blocks of source code associated with an implementation-agnostic context on a particular processing unit (e.g., processor, core, etc.) of a device of the second target platform. In embodiments, the platform-agnostic framework implements a third mutual exclusion implementation for a third target platform by generating platform-specific code to determine, at runtime, whether to execute blocks of source code associated with an implementation-agnostic context under a current thread of execution on a first processing unit (e.g., processor, core, etc.) of a device of the third target platform, or to schedule the execution of the blocks of source code associated with an implementation-agnostic context on a queue associated with a second processing unit (e.g., processor, core, etc.) of the device of the third target platform. In embodiments, the device of the third target platform makes the runtime determination based on various factors, such as, but not limited to, resource utilization and/or availability associated with one or more processing units (e.g., processor, core, etc.), priority information associated with the blocks of source code associated with the implementation-agnostic context, processing unit information associated with other instances of code associated with the implementation-agnostic context, and/or the like.

These and further embodiments are disclosed herein that enable the functionality described above and additional functionality. Such embodiments are described in further detail as follows.

FIG. 1 shows a block diagram of an example system 100 for generating, based on platform-agnostic source code, platform-specific code to efficiently implement mutual exclusion on a specific platform, in accordance with an embodiment. As shown in FIG. 1, system 100 comprises a computing device 102 that comprises a platform-agnostic framework 104, and one or more platform-specific frameworks 106A-106N. System 100 is described in further detail as follows.

Computing device 102 comprises any computing device or plurality of computing devices suitable for performing functions that are ascribed thereto in the following description, as will be appreciated by persons skilled in the relevant art(s), including those mentioned elsewhere herein or otherwise known. Various example implementations of computing device 102 are described below in reference to FIG. 8 (e.g., computing device 802, network-based server infrastructure 870, on-premises servers 892, and/or components thereof).

Platform-agnostic framework 104 is configured to generate one or more platform-specific code 112A-112N for one or more target platforms 106A-106N based on platform-agnostic source code 110. In embodiments, platform-agnostic framework 104 analyzes platform-agnostic source code 110 to determine a first block code associated with an implementation-agnostic context, and determines, based on a platform identifier 108, a mutual exclusion implementation for a target platform associated with platform identifier 108. Platform-agnostic framework 104, in embodiments, generates platform-specific code 112 (e.g., platform-specific code 112A-112N) to execute the first block of code using the determined mutual exclusion implementation. In embodiments, platform-agnostic framework 104 provides the generated platform-specific code 112 (e.g., platform-specific code 112A-112N) to a platform-specific framework 106 (e.g., platform-specific framework(s) 106A-106N) associated with the target platform to enable the platform-specific framework 106 (e.g., platform-specific framework(s) 106A-106N) to compile the platform-specific code 112 (e.g., platform-specific code 112A-112N) for execution on a device of the target platform. Platform-agnostic framework 104 is described in greater detail below in conjunction with FIG. 2.

Platform-specific framework(s) 106A-106N comprise software development tools configured to generate platform-specific applications for execution on a target platform. In embodiments, platform-specific framework(s) 106A-106N comprise components such as, but not limited to, libraries, APIs, and/or reusable components that abstract away low-level tasks and/or platform-specific complexities associated with the target platform. In embodiments, platform-specific framework(s) 106A-106N receives, as input, platform-specific code (e.g., platform-specific source code), and generates, as output, a platform-specific executable that can be executed on a device of the target platform. Platform-specific framework(s) 106A-106N are described in greater detail below in conjunction with FIG. 2.

Figure 2:
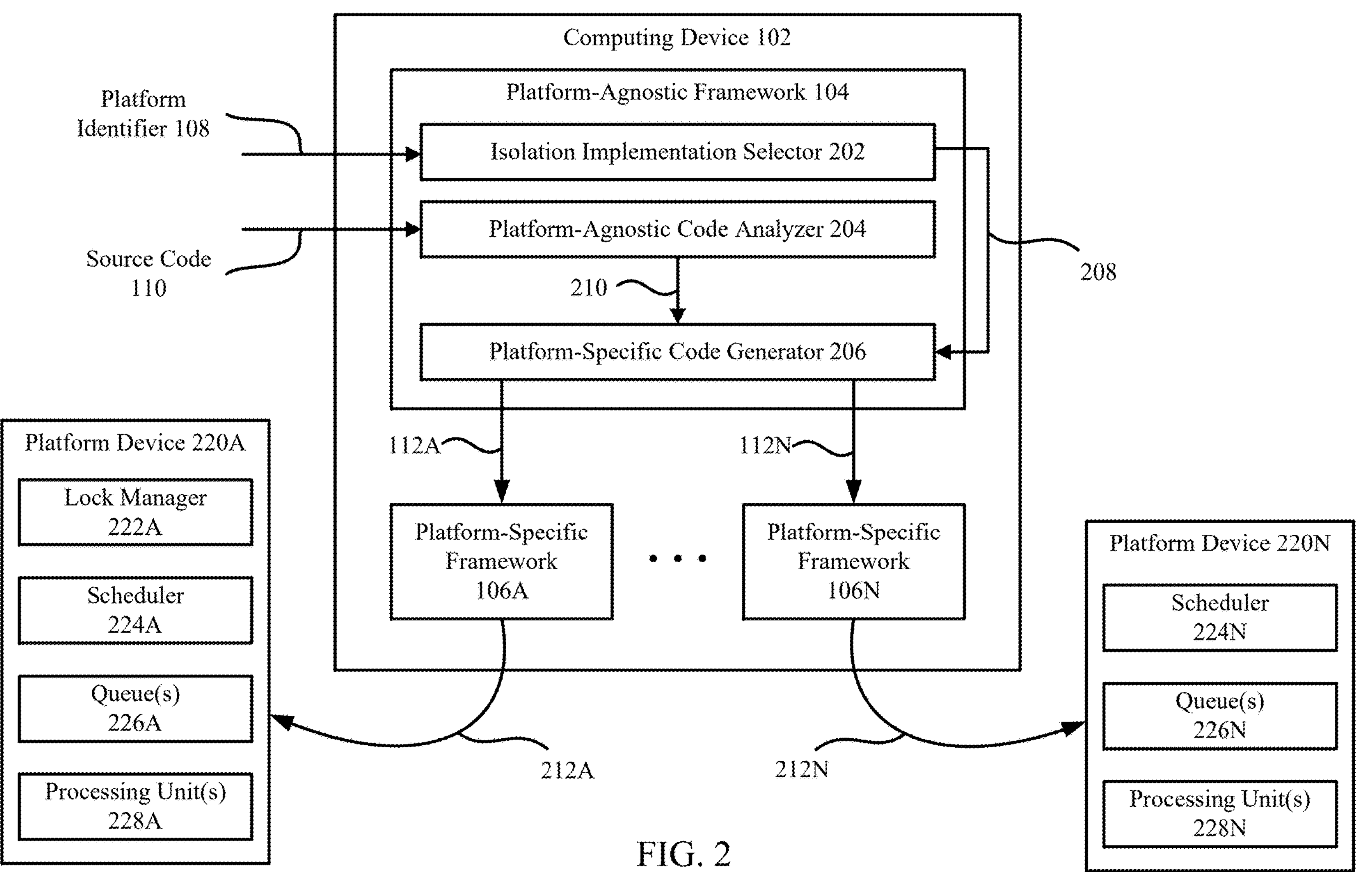
FIG. 2 shows a block diagram of an example system for generating platform-specific code to efficiently implement mutual exclusion on a device of the specific platform, in accordance with an embodiment.

Embodiments described herein may operate in various ways to generate and/or execute platform-specific code to efficiently implement mutual exclusion on a device of a specific platform, in accordance with an embodiment FIG. 2 shows a block diagram of an example system 200 for generating and/or executing platform-specific code to efficiently implement mutual exclusion on a device of a specific platform, in accordance with an embodiment. As shown in FIG. 2, system 200 comprises computing device 102, platform-agnostic framework 104, and platform-specific framework(s) 106A-106N. In system 200, platform-agnostic framework 104 further comprises an isolation implementation selector 202, a platform-agnostic code analyzer 204, and a platform-specific code generator 206. System 200 further comprises one or more platform devices 220A-220N that comprise a lock manager 222 (e.g., lock manager 222A), a scheduler 224 (e.g., scheduler(s) 224A-224N, one or more queues 226 (e.g., queue(s) 226A-226N), and one or more processing units 228 (e.g., processing unit(s) 228A-228N). As shown in FIG. 2, lock manager 222 may, in embodiments, be omitted from some platform device(s) 220A-220N. System 200 is described in further detail as follows.

Isolation implementation selector 202 is configured to select a mutual exclusion implementation based on a platform identifier. For instance, isolation implementation selector 202 determines a mutual exclusion implementation 208 based on platform identifier 108, and provides mutual exclusion implementation 208 to platform-specific code generator 206. In embodiments, isolation implementation selector 202 determines a mutual exclusion implementation for a target platform in various ways, such as, but not limited to, based on input from subject matter experts familiar with platform-specific benefits associated with various mutual exclusion implementations, based on analysis of platform-specific historical performance data associated with various mutual exclusion implementations, and/or the like. In embodiments, mutual exclusion implementation 208, includes, but is not limited to, a lock-based mutual exclusion implementation that employs a lock to ensure isolated execution of blocks of source code associated with an implementation-agnostic context, a scheduling-based mutual exclusion implementation to schedule execution of blocks of source code associated with an implementation-agnostic context on a particular processing unit (e.g., processor, core, etc.) of a device of the target platform, and/or a runtime-based mutual exclusion implementation to determine, at runtime, whether to execute blocks of source code associated with an implementation-agnostic context under a current thread of execution on a first processing unit (e.g., processor, core, etc.) of a device of the target platform, or to schedule the execution of the blocks of source code associated with an implementation-agnostic context on a queue associated with a second processing unit (e.g., processor, core, etc.) of the device of the target platform.

Platform-agnostic code analyzer 204 is configured to analyze platform-agnostic source code to determine blocks of code associated with implementation-agnostic contexts.

In embodiments, platform-agnostic code analyzer 204 analyzes platform-agnostic source code 110 to identify blocks of code contained therein that are associated with implementation-agnostic contexts, and provides, to platform-specific code generator 206 as output 210, the identified blocks of code and corresponding implementation-agnostic contexts.

Platform-specific code generator 206 is configured to generate, based on a determined mutual exclusion implementation, platform-specific code from platform-agnostic source code. For instance, platform-specific code generator 206 generates platform-specific code 112 (e.g., platform-specific code 112A-112N) based on platform-agnostic source code 110 and mutual exclusion implementation 208. In embodiments, platform-specific code generator 206 generates platform-specific code 112A-112N to implement mutual exclusion implementation 208 in various ways, such as, but not limited to, by generating platform-specific code to employ a lock to ensure isolated execution of blocks of source code associated with an implementation-agnostic context, by generating platform-specific code to schedule execution of blocks of source code associated with an implementation-agnostic context on a particular processing unit (e.g., processor, core, etc.) of a device of the target platform, and/or by generating platform-specific code to determine, at runtime, whether to execute blocks of source code associated with an implementation-agnostic context under a current thread of execution on a first processing unit (e.g., processor, core, etc.) of a device of the target platform, or to schedule the execution of the blocks of source code associated with an implementation-agnostic context on a queue associated with a second processing unit (e.g., processor, core, etc.) of the device of the target platform. In embodiments, platform-specific code generator 206 provides platform-specific code 112A-112N to platform-specific framework(s) 106A-106N, respectively, to enable platform-specific framework(s) 106A-106N to generate one or more platform-specific executables 212A-212N for execution on platform device(s) 220A-220N, respectively.

Platform device(s) 220A-220N any computing device or plurality of computing devices suitable for performing functions that are ascribed thereto in the following description, as will be appreciated by persons skilled in the relevant art(s), including those mentioned elsewhere herein or otherwise known. In embodiments, platform device(s) 220A-220N comprise a particular combination of hardware and software components that provide a foundation for running platform-specific applications. As shown in FIG. 2, platform device(s) 220A-220N comprise a lock manager 222 (e.g., lock manager 222A), a scheduler 224 (e.g., scheduler(s) 224A-224N), queue(s) 226 (e.g., queue(s) 226A-226N), and processing unit(s) 228 (e.g., processing unit(s) 228A-228N. Various example implementations of platform device(s) 220A-220N are described below in reference to FIG. 8 (e.g., computing device 802, network-based server infrastructure 870, on-premises servers 892, and/or components thereof).

Lock manager 222A is configured to manage concurrency control through the use of locks. In embodiments, lock manager 222A perform various tasks associated with lock-based concurrency control, such as, but not limited to, initialization of locks, receiving lock requests, granting lock requests, waitlisting lock requests, resolving lock conflicts, preventing deadlock situations, and/or the like.

Scheduler(s) 224A-224N are configured to schedule instructions in queue(s) 226A-226N for execution by processing unit(s) 228A-228N. In embodiments, scheduler(s) 224A-224N schedule instances of code associated with the same context (e.g., implementation-agnostic context, etc.) on the same processing unit (processing unit(s) 228A-228N) to enforce mutual exclusion. Since instances executing on the same processor unit cannot execute at the same time, mutual exclusion is achieved. In embodiments, scheduler(s) 224A-224N schedule instructions on queue(s) 226A-226N for execution by processing unit(s) 228A-228N based on various factors, such as, but not limited to, resource utilization and/or availability associated with processing unit(s) 228A-228N, priority information associated with the instructions, processing unit affinity information associated with other instances of code associated with same context, and/or the like.

Queue(s) 226A-226N are configured to manage the flow of instructions to be executed by processing unit(s) 228A-228N. In embodiments, queue(s) 226A-226N are associated with a specific processing unit of processing unit(s) 228A-228N. In embodiments, a plurality of queue(s) 226A-226N are associated with a specific processing unit processing unit(s) 228A-228N.

Processing unit(s) 228A-228N comprise one or more hardware components for executing instructions (e.g., platform-specific executable(s) 212A-212N, and/or portions thereof). In embodiments, processing unit(s) 228A-228N include, but are not limited to, a central processing unit (CPU), a data processing unit (DPU), a graphics processing unit (GPU), a general-purpose processor, an accelerated processing unit (APU), and/or portions (e.g., core, etc.) thereof. Various example implementations of processing unit(s) 228A-228N are described below in reference to FIG. 8 (e.g., processor 810, GPU 842, NPU 844, processor 858, processor 890, and/or components thereof).

Figure 3:
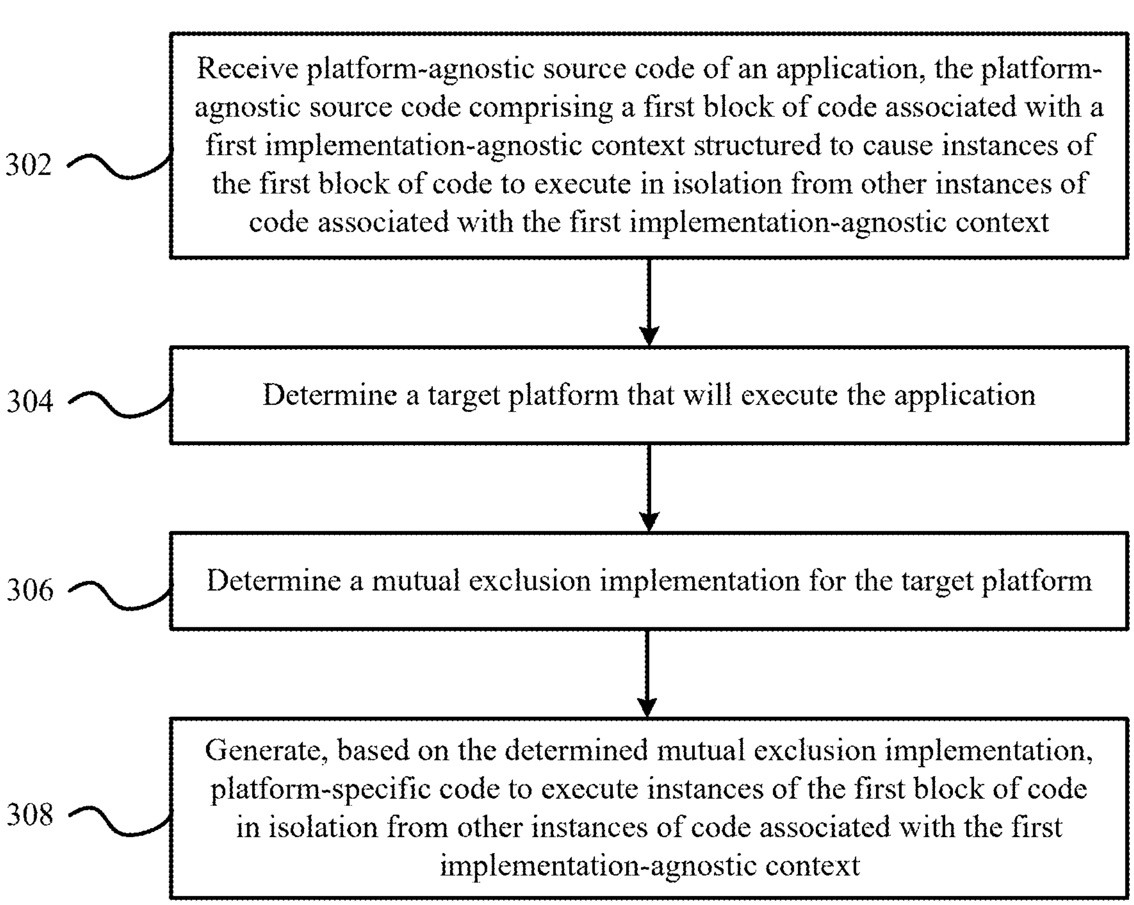
FIG. 3 depicts a flowchart of a process for generating, based on platform-agnostic source code, platform-specific code to efficiently implement mutual exclusion on a specific platform, in accordance with an embodiment.

Embodiments described herein may operate in various ways to generate, based on platform-agnostic source code, platform-specific code to efficiently implement mutual exclusion on a specific platform. FIG. 3 depicts a flowchart 300 of a process for generating, based on platform-agnostic source code, platform-specific code to efficiently implement mutual exclusion on a specific platform, in accordance with an embodiment. Computing device 102, platform-agnostic framework 104, isolation implementation selector 202, platform-agnostic code analyzer 204, platform-specific code generator 206, and/or components thereof, may, for example, operate according to flowchart 300. Note that not all steps of flowchart 300 may need to be performed in all embodiments, and in some embodiments, the steps of flowchart 300 may be performed in different orders than shown. Flowchart 300 is described as follows with respect to FIGS. 1-2 for illustrative purposes.

Flowchart 300 starts at step 302. In step 302, platform-agnostic source code of an application is received, the platform-agnostic source code comprising a first block of code associated with a first implementation-agnostic context structured to cause instances of the first block of code to execute in isolation from other instances of code associated with the first implementation-agnostic context. For example, platform-agnostic code analyzer 204 receives platform-agnostic source code 110 that comprises a first block of code associated with a first implementation-agnostic context.

In step 304, a target platform that will execute the application is determined. For example, isolation implementation selector 202 receives platform identifier 108. In embodiments, platform identifier 108 is provided by a developer when generating platform-specific code for a target platform from platform-agnostic source code.

In step 306, a mutual exclusion implementation is determined for the target platform. For example, isolation implementation selector 202 determines a mutual exclusion implementation 208 based on platform identifier 108. In embodiments, isolation implementation selector 202 determines a mutual exclusion implementation for a target platform in various ways, such as, but not limited to, based on input from subject matter experts familiar with platform-specific benefits associated with various mutual exclusion implementations, based on analysis of platform-specific historical performance data associated with various mutual exclusion implementations, and/or the like.

In step 308, platform-specific code is generated based on the determined mutual exclusion implementation, the platform-specific code to execute instances of the first block of code in isolation from other instances of code associated with the first implementation-agnostic context. For example, platform-specific code generator 206 generates platform-specific code 112 (e.g., platform-specific code 112A-112N) based on platform-agnostic source code 110 and mutual exclusion implementation 208. In embodiments, platform-specific code generator 206 generates platform-specific code 112A-112N to implement mutual exclusion implementation 208 in various ways, such as, but not limited to, by generating platform-specific code to employ a lock to ensure isolated execution of blocks of source code associated with an implementation-agnostic context, by generating platform-specific code to schedule execution of blocks of source code associated with an implementation-agnostic context on a particular processing unit (e.g., processor, core, etc.) of a device of the target platform, and/or by generating platform-specific code to determine, at runtime, whether to execute blocks of source code associated with an implementation-agnostic context under a current thread of execution on a first processing unit (e.g., processor, core, etc.) of a device of the target platform, or to schedule the execution of the blocks of source code associated with an implementation-agnostic context on a queue associated with a second processing unit (e.g., processor, core, etc.) of the device of the target platform. In embodiments, platform-specific code generator 206 provides platform-specific code 112A-112N to platform-specific framework(s) 106A-106N, respectively, to enable platform-specific framework(s) 106A-106N to generate platform-specific executable(s) 212A-212N for execution on platform device(s) 220A-220N, respectively.

Figure 4:
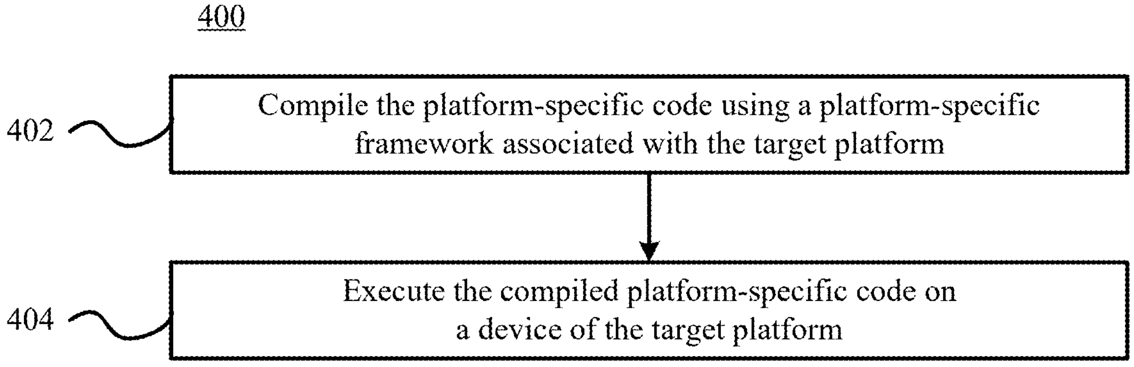
FIG. 4 depicts a flowchart of a process for generating platform-specific code to efficiently implement mutual exclusion on a device of the specific platform, in accordance with an embodiment.

Embodiments described herein may operate in various ways to generate and/or execute platform-specific code to efficiently implement mutual exclusion on a device of a specific platform. FIG. 4 depicts a flowchart 400 of a process generating and/or executing platform-specific code to efficiently implement mutual exclusion on a device of a specific platform, in accordance with an embodiment. Computing device 102, platform-agnostic framework 104, platform-specific framework(s) 106A-106N, isolation implementation selector 202, platform-agnostic code analyzer 204, platform-specific code generator 206, platform device(s) 2220A-220N, lock manager 222A, scheduler(s) 224A-224N, queue(s) 226A-226N, processing unit(s) 228A-228N, and/or components thereof, may, for example, operate according to flowchart 400. Note that not all steps of flowchart 400 may need to be performed in all embodiments. Flowchart 400 is described as follows with respect to FIGS. 1-2 for illustrative purposes.

Flowchart 400 starts at step 402. In step 402, platform-specific code is compiled using a platform-specific framework associated with a target platform. For example, platform-specific framework(s) 106A-106N compiles platform-specific code 112A-112N (e.g., platform-specific source code, etc.) to generate platform-specific executable(s) 212A-212N.

In step 404, the compiled platform-specific code is executed on a device of the target platform. For example, platform device(s) 220A-220N execute platform-specific executable(s) 212A-212N.

Figure 5:
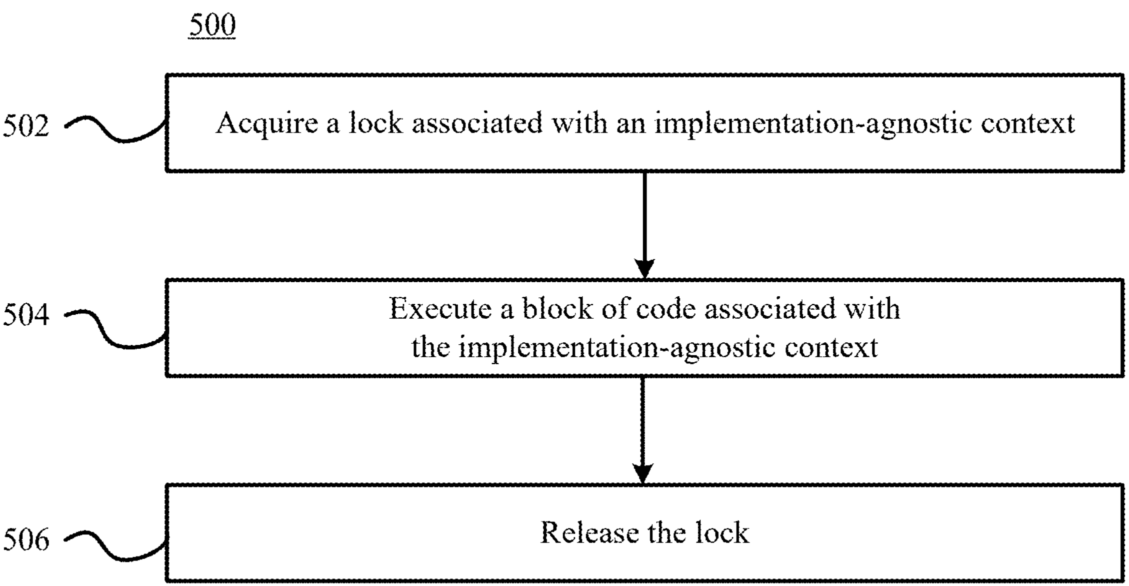
FIG. 5 depicts a flowchart of a process for implementing, based on an implementation-agnostic context, mutual exclusion using a lock associated with the implementation-agnostic context, in accordance with an embodiment.

Embodiments described herein may operate in various ways to implement, based on an implementation-agnostic context, mutual exclusion using a lock associated with the implementation-agnostic context. FIG. 5 depicts a flowchart 500 of a process for implementing, based on an implementation-agnostic context, mutual exclusion using a lock associated with the implementation-agnostic context, in accordance with an embodiment. Computing device 102, platform-agnostic framework 104, platform-specific framework(s) 106A-106N, isolation implementation selector 202, platform-agnostic code analyzer 204, platform-specific code generator 206, platform device(s) 2220A-220N, lock manager 222A, scheduler(s) 224A-224N, queue(s) 226A-226N, processing unit(s) 228A-228N, and/or components thereof, may, for example, operate according to flowchart 500. Note that not all steps of flowchart 500 may need to be performed in all embodiments, and in some embodiments, the steps of flowchart 500 may be performed in different orders than shown. Flowchart 500 is described as follows with respect to FIGS. 1-2 for illustrative purposes.

Flowchart 500 starts at step 502. In step 502, a lock associated with an implementation-agnostic context is acquired. For example, a thread executing on processing unit(s) 228A-228N interacts with lock manager 222A to acquire a lock associated with an implementation-agnostic context.

In step 504, a block of code associated with the implementation-agnostic context is executed. For example, once the lock is acquired, the thread executes a block of code associated with the implementation-agnostic context.

In step 506, the lock is released. For example, after the block of code associated with the implementation-agnostic context is executed, the thread interacts with lock manager 222A to release the acquired lock associated with the implementation-agnostic context.

Figure 6:
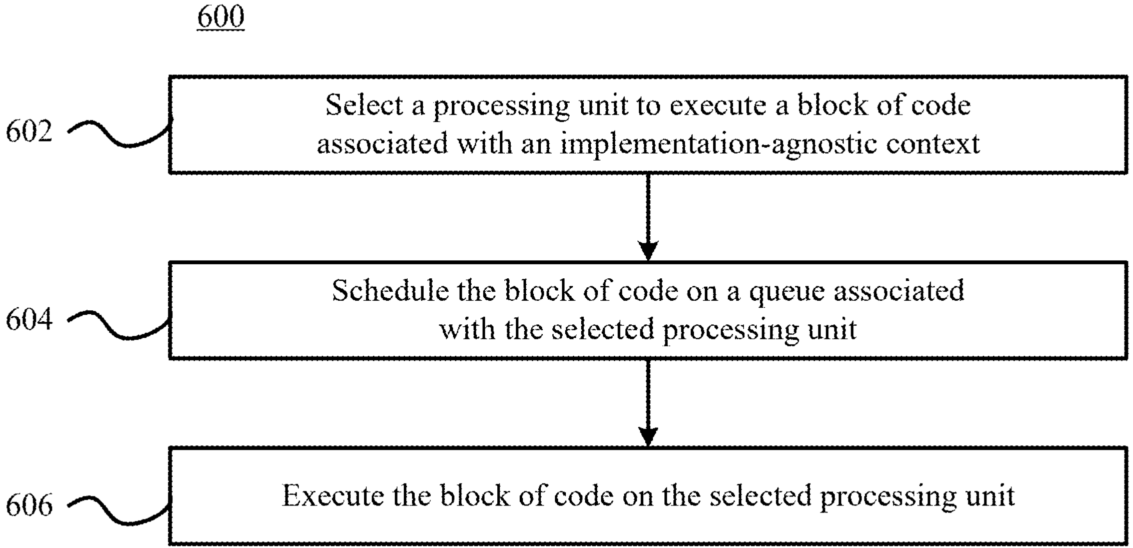
FIG. 6 depicts a flowchart of a process for implementing, based on an implementation-agnostic context, mutual exclusion by scheduling a block of code to execute on a selected processing unit of a platform-specific device, in accordance with an embodiment.

Embodiments described herein may operate in various ways to implement, based on an implementation-agnostic context, mutual exclusion by scheduling a block of code to execute on a selected processing unit of a platform-specific device. FIG. 6 depicts a flowchart 600 of a process for implementing, based on an implementation-agnostic context, mutual exclusion by scheduling a block of code to execute on a selected processing unit of a platform-specific device, in accordance with an embodiment. Computing device 102, platform-agnostic framework 104, platform-specific framework(s) 106A-106N, isolation implementation selector 202, platform-agnostic code analyzer 204, platform-specific code generator 206, platform device(s) 2220A-220N, lock manager 222A, scheduler(s) 224A-224N, queue(s) 226A-226N, processing unit(s) 228A-228N, and/or components thereof, may, for example, operate according to flowchart 600. Note that not all steps of flowchart 600 may need to be performed in all embodiments, and in some embodiments, the steps of flowchart 600 may be performed in different orders than shown. Flowchart 600 is described as follows with respect to FIGS. 1-2 for illustrative purposes.

Flowchart 600 starts at step 602. In step 602, a processing unit is selected to execute a block of code associated with an implementation-agnostic context. For example, scheduler(s)

224A-224N select a processing unit 228 (e.g., processing unit(s) 228A-228N) to execute a block of code associated with an implementation-agnostic context.

In step 604, the block of code is scheduled on a queue associated with the selected processing unit. For example, scheduler(s) 224A-224N schedule the block of code on a queue 226 (e.g., queue(s) 226A-226N) associated with the selected processing unit 228 (e.g., processing unit(s) 228A-228N).

In step 606, the block of code is executed on the selected processing unit. For example, the block of code is executed on the selected processing unit 228 (e.g., processing unit(s) 228A-228N).

Figure 7:
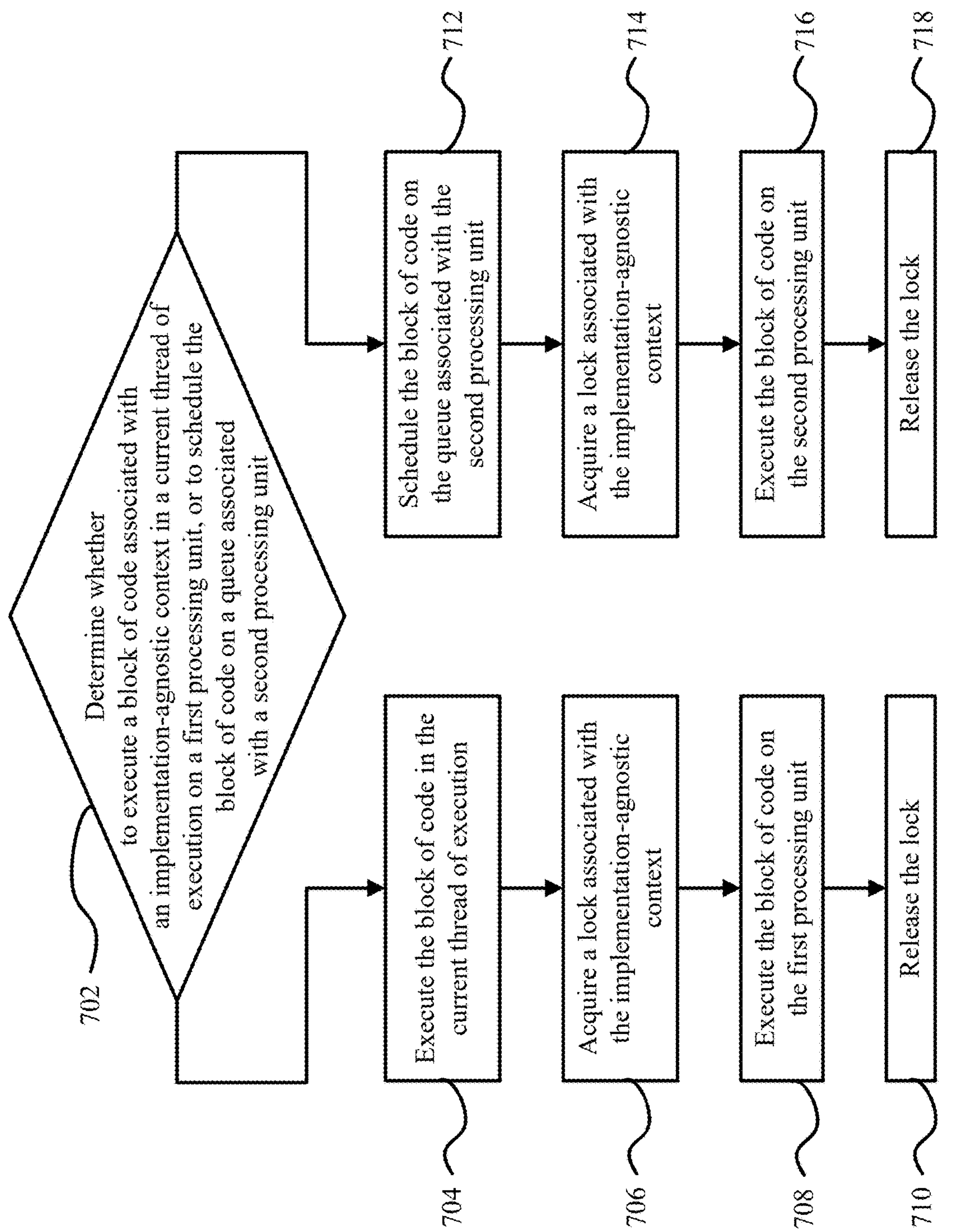
FIG. 7 depicts a flowchart of a process for implementing, based on an implementation-agnostic context, mutual exclusion by using a lock associated with the implementation-agnostic context and/or by scheduling a block of code to execute on a selected processing unit of a platform-specific device, in accordance with an embodiment.

Embodiments described herein may operate in various ways to implement, based on an implementation-agnostic context, mutual exclusion by using a lock associated with the implementation-agnostic context and/or by scheduling a block of code to execute on a selected processing unit of a platform-specific device. FIG. 7 depicts a flowchart 700 of a process for implementing, based on an implementation-agnostic context, mutual exclusion by using a lock associated with the implementation-agnostic context and/or by scheduling a block of code to execute on a selected processing unit of a platform-specific device, in accordance with an embodiment. Computing device 102, platform-agnostic framework 104, platform-specific framework(s) 106A-106N, isolation implementation selector 202, platform-agnostic code analyzer 204, platform-specific code generator 206, platform device(s) 2220A-220N, lock manager 222A, scheduler(s) 224A-224N, queue(s) 226A-226N, processing unit(s) 228A-228N, and/or components thereof, may, for example, operate according to flowchart 700. Note that not all steps of flowchart 700 may need to be performed in all embodiments, and in some embodiments, the steps of flowchart 700 may be performed in different orders than shown. Flowchart 700 is described as follows with respect to FIGS. 1-2 for illustrative purposes.

Flowchart 700 starts at step 702. In step 702, it is determined whether a block of code associated with an implementation-agnostic context should be executed in a current thread of execution on a first processing unit, or scheduled on a queue associated with a second processing unit. If it is determined that the block of code should be executed in a current thread of execution on a first processing unit, flowchart 700 proceeds to step 704, otherwise, flowchart 700 proceeds to step 712. For example, scheduler(s) 224A-224N determine, during runtime, whether a block of code associated with an implementation-agnostic context should be executed in a current thread of execution on a first processing unit 228 (e.g., processing unit(s) 228A-228N), or scheduled on a queue 226 (e.g., queue(s) 226A-226N) associated with a second processing unit 228 (e.g., processing unit(s) 228A-228N).

In step 704, the block of code is executed in the current thread of execution. For example, scheduler(s) 224A-224N determines, during runtime, that the block of code should be executed in the current thread of execution on the first processing unit 228 (e.g., processing unit(s) 228A-228N).

In step 706, the lock associated with the implementation-agnostic context is acquired. For example, the current thread of execution executing on the first processing unit 228 (e.g., processing unit(s) 228A-228N) interacts with lock manager 222A to acquire a lock associated with the implementation-agnostic context.

In step 708, the block of code is executed on the first processing unit. For example, the current thread of execution executing on the first processing unit 228 (e.g., processing unit(s) 228A-228N) executes the block of code on the first processing unit 228 (e.g., processing unit(s) 228A-228N).

In step 710, the lock is released. For example, the current thread of execution executing on the first processing unit 228 (e.g., processing unit(s) 228A-228N) interacts with lock manager 222A to release the acquired lock associated with the implementation-agnostic context.

In step 712, the block of code is scheduled on the queue associated with the second processing unit. For example, scheduler(s) 224A-224N schedule the block of code on a queue 226 (e.g., queue(s) 226A-226N) associated with a second processing unit 228 (e.g., processing unit(s) 228A-228N).

In step 714, the lock associated with the implementation-agnostic context is acquired. For example, a second thread of execution executing on the second processing unit 228 (e.g., processing unit(s) 228A-228N) interacts with lock manager 222A to acquire a lock associated with the implementation-agnostic context.

In step 716, the block of code is executed on the second processing unit. For example, the second thread of execution executing on the second processing unit 228 (e.g., processing unit(s) 228A-228N) executes the block of code on the second processing unit 228 (e.g., processing unit(s) 228A-228N).

In step 718, the lock is released. For example, the second thread of execution executing on the second processing unit 228 (e.g., processing unit(s) 228A-228N) interacts with lock manager 222A to release the acquired lock associated with the implementation-agnostic context.

III. Example Mobile Device and Computer System Implementation

Computing device 102, platform-agnostic framework 104, platform-specific framework(s) 106A-106N, isolation implementation selector 202 platform-agnostic code analyzer 204, platform-specific code generator 206, platform device(s) 220A-220N, lock manager 222A, scheduler(s) 224A-224N, queue(s) 226A-226N, processing unit(s) 228A-228N, and/or the components described therein, and/or the steps of flowcharts 300, 400, 500, 600, and/or 700 are implemented in hardware, or hardware combined with one or both of software and/or firmware. For example, computing device 102, platform-agnostic framework 104, platform-specific framework(s) 106A-106N, isolation implementation selector 202 platform-agnostic code analyzer 204, platform-specific code generator 206, platform device(s) 220A-220N, lock manager 222A, scheduler(s) 224A-224N, queue(s) 226A-226N, processing unit(s) 228A-228N, and/or the components described therein, and/or the steps of flowcharts 300, 400, 500, 600, and/or 700 are each implemented as computer program code/instructions configured to be executed in one or more processors and stored in a computer readable storage medium. Alternatively, computing device 102, platform-agnostic framework 104, platform-specific framework(s) 106A-106N, isolation implementation selector 202 platform-agnostic code analyzer 204, platform-specific code generator 206, platform device(s) 220A-220N, lock manager 222A, scheduler(s) 224A-224N, queue(s) 226A-226N, processing unit(s) 228A-228N, and/or the components described therein, and/or the steps of flowcharts 300, 400, 500, 600, and/or 700 are implemented in one or more SoCs (system on chip). An SoC includes an integrated circuit chip that includes one or more of a processor (e.g., a central processing unit (CPU), microcontroller, microprocessor, digital signal processor (DSP), etc.), memory, one or more communication interfaces, and/or further circuits, and optionally executes received program code and/or include embedded firmware to perform functions.

Figure 8:
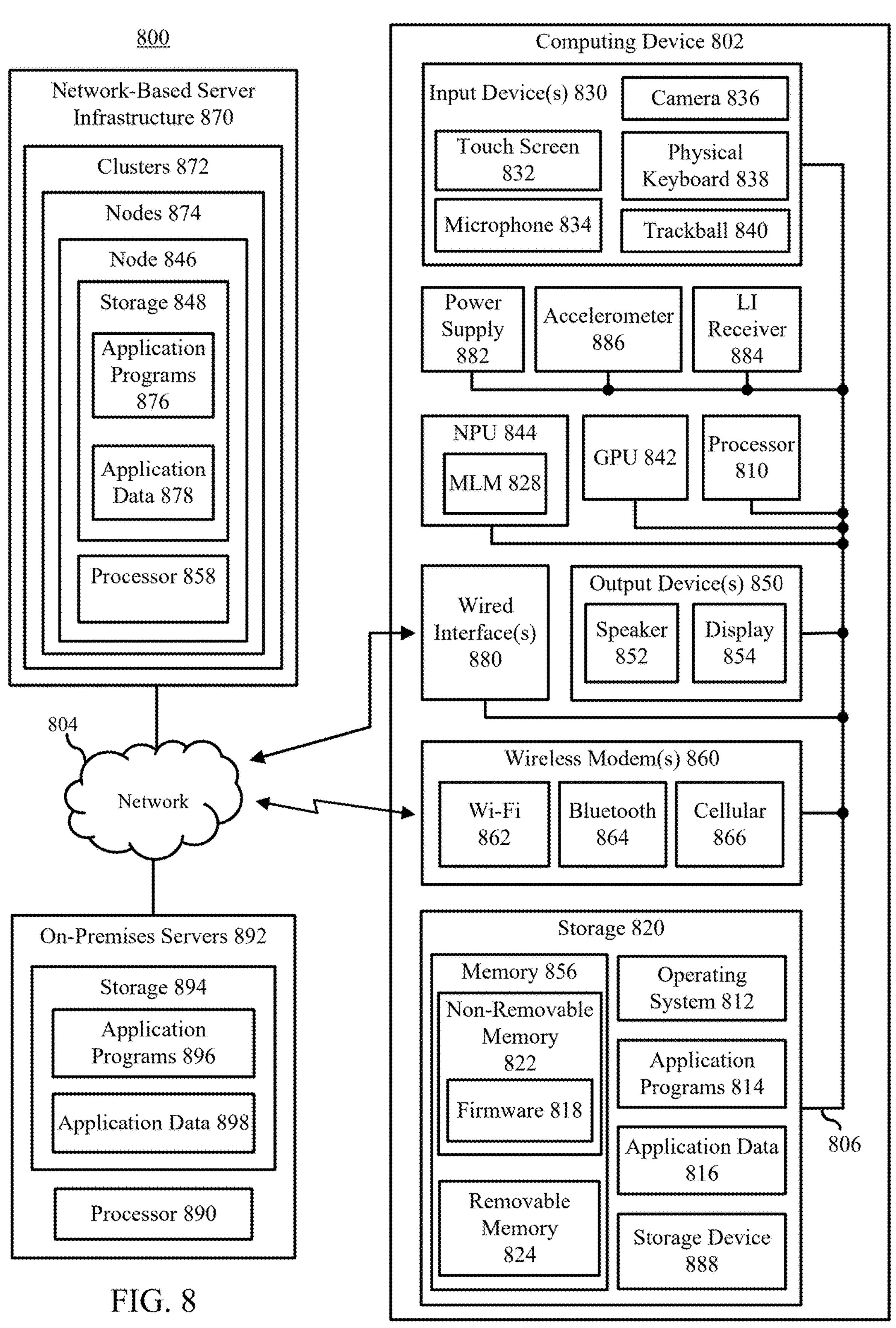
FIG. 8 shows a block diagram of an example computer system in which embodiments may be implemented.

Embodiments disclosed herein can be implemented in one or more computing devices that are mobile (a mobile device) and/or stationary (a stationary device) and include any combination of the features of such mobile and stationary computing devices. Examples of computing devices in which embodiments are implementable are described as follows with respect to FIG. 8. FIG. 8 shows a block diagram of an exemplary computing environment 800 that includes a computing device 802. Computing device 802 is an example of computing device 102 and/or platform device(s) 220A-220N, which each include one or more of the components of computing device 802. In some embodiments, computing device 802 is communicatively coupled with devices (not shown in FIG. 8) external to computing environment 800 via network 804. Network 804 comprises one or more networks such as local area networks (LANs), wide area networks (WANs), enterprise networks, the Internet, etc. In examples, network 804 includes one or more wired and/or wireless portions. In some examples, network 804 additionally or alternatively includes a cellular network for cellular communications. Computing device 802 is described in detail as follows.

Computing device 802 can be any of a variety of types of computing devices. Examples of computing device 802 include a mobile computing device such as a handheld computer (e.g., a personal digital assistant (PDA)), a laptop computer, a tablet computer, a hybrid device, a notebook computer, a netbook, a mobile phone (e.g., a cell phone, a smart phone, etc.), a wearable computing device (e.g., a head-mounted augmented reality and/or virtual reality device including smart glasses), or other type of mobile computing device. In an alternative example, computing device 802 is a stationary computing device such as a desktop computer, a personal computer (PC), a stationary server device, a minicomputer, a mainframe, a supercomputer, etc.

As shown in FIG. 8, computing device 802 includes a variety of hardware and software components, including a processor 810, a storage 820, a graphics processing unit (GPU) 842, a neural processing unit (NPU) 844, one or more input devices 830, one or more output devices 850, one or more wireless modems 860, one or more wired interfaces 880, a power supply 882, a location information (LI) receiver 884, and an accelerometer 886. Storage 820 includes memory 856, which includes non-removable memory 822 and removable memory 824, and a storage device 888. Storage 820 also stores an operating system 812, application programs 814, and application data 816. Wireless modem(s) 860 include a Wi-Fi modem 862, a Bluetooth modem 864, and a cellular modem 866. Output device(s) 850 includes a speaker 852 and a display 854. Input device(s) 830 includes a touch screen 832, a microphone 834, a camera 836, a physical keyboard 838, and a trackball 840. Not all components of computing device 802 shown in FIG. 8 are present in all embodiments, additional components not shown may be present, and in a particular embodiment any combination of the components are present. In examples, components of computing device 802 are mounted to a circuit card (e.g., a motherboard) of computing device 802, integrated in a housing of computing device 802, or otherwise included in computing device 802. The components of computing device 802 are described as follows.

In embodiments, a single processor 810 (e.g., central processing unit (CPU), microcontroller, a microprocessor, signal processor, ASIC (application specific integrated circuit), and/or other physical hardware processor circuit) or multiple processors 810 are present in computing device 802 for performing such tasks as program execution, signal coding, data processing, input/output processing, power control, and/or other functions. In examples, processor 810 is a single-core or multi-core processor, and each processor core is single-threaded or multithreaded (to provide multiple threads of execution concurrently). Processor 810 is configured to execute program code stored in a computer readable medium, such as program code of operating system 812 and application programs 814 stored in storage 820. The program code is structured to cause processor 810 to perform operations, including the processes/methods disclosed herein. Operating system 812 controls the allocation and usage of the components of computing device 802 and provides support for one or more application programs 814 (also referred to as "applications" or "apps"). In examples, application programs 814 include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein. In examples, processor(s) 810 includes one or more general processors (e.g., CPUs) configured with or coupled to one or more hardware accelerators, such as one or more NPUs 844 and/or one or more GPUs 842.

Any component in computing device 802 can communicate with any other component according to function, although not all connections are shown for ease of illustration. For instance, as shown in FIG. 8, bus 806 is a multiple signal line communication medium (e.g., conductive traces in silicon, metal traces along a motherboard, wires, etc.) present to communicatively couple processor 810 to various other components of computing device 802, although in other embodiments, an alternative bus, further buses, and/or one or more individual signal lines is/are present to communicatively couple components. Bus 806 represents one or more of any of several types of bus structures, including a memory bus or memory controller, a peripheral bus, an accelerated graphics port, and a processor or local bus using any of a variety of bus architectures.

Storage 820 is physical storage that includes one or both of memory 856 and storage device 888, which store operating system 812, application programs 814, and application data 816 according to any distribution. Non-removable memory 822 includes one or more of RAM (random access memory), ROM (read only memory), flash memory, a solid-state drive (SSD), a hard disk drive (e.g., a disk drive for reading from and writing to a hard disk), and/or other physical memory device type. In examples, non-removable memory 822 includes main memory and is separate from or fabricated in a same integrated circuit as processor 810. As shown in FIG. 8, non-removable memory 822 stores firmware 818 that is present to provide low-level control of hardware. Examples of firmware 818 include BIOS (Basic Input/Output System, such as on personal computers) and boot firmware (e.g., on smart phones). In examples, removable memory 824 is inserted into a receptacle of or is otherwise coupled to computing device 802 and can be removed by a user from computing device 802. Removable memory 824 can include any suitable removable memory device type, including an SD (Secure Digital) card, a Subscriber Identity Module (SIM) card, which is well known in GSM (Global System for Mobile Communications) communication systems, and/or other removable physical memory device type. In examples, one or more of storage device 888 are present that are internal and/or external to a housing of computing device 802 and are or are not removable. Examples of storage device 888 include a hard disk drive, a SSD, a thumb drive (e.g., a USB (Universal Serial Bus) flash drive), or other physical storage device.

One or more programs are stored in storage 820. Such programs include operating system 812, one or more application programs 814, and other program modules and program data. Examples of such application programs include computer program logic (e.g., computer program code/instructions) for implementing computing device 102, platform-agnostic framework 104, platform-specific framework(s) 106A-106N, isolation implementation selector 202 platform-agnostic code analyzer 204, platform-specific code generator 206, platform device(s) 220A-220N, lock manager 222A, scheduler(s) 224A-224N, queue(s) 226A-226N, processing unit(s) 228A-228N, and/or each of the components described therein, as well as any of flowcharts 300, 400, 500, 600, 700, and/or any individual steps thereof.

Storage 820 also stores data used and/or generated by operating system 812 and application programs 814 as application data 816. Examples of application data 816 include web pages, text, images, tables, sound files, video data, and other data. In examples, application data 816 is sent to and/or received from one or more network servers or other devices via one or more wired or wireless networks. Storage 820 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

In examples, a user enters commands and information into computing device 802 through one or more input devices 830 and receives information from computing device 802 through one or more output devices 850. Input device(s) 830 includes one or more of touch screen 832, microphone 834, camera 836, physical keyboard 838 and/or trackball 840 and output device(s) 850 includes one or more of speaker 852 and display 854. Each of input device(s) 830 and output device(s) 850 are integral to computing device 802 (e.g., built into a housing of computing device 802) or are external to computing device 802 (e.g., communicatively coupled wired or wirelessly to computing device 802 via wired interface(s) 880 and/or wireless modem(s) 860). Further input devices 830 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 854 displays information, as well as operating as touch screen 832 by receiving user commands and/or other information (e.g., by touch, finger gestures, virtual keyboard, etc.) as a user interface. Any number of each type of input device(s) 830 and output device(s) 850 are present, including multiple microphones 834, multiple cameras 836, multiple speakers 852, and/or multiple displays 854.

In embodiments where GPU 842 is present, GPU 842 includes hardware (e.g., one or more integrated circuit chips that implement one or more of processing cores, multiprocessors, compute units, etc.) configured to accelerate computer graphics (two-dimensional (2D) and/or three-dimensional (3D)), perform image processing, and/or execute further parallel processing applications (e.g., training of neural networks, etc.). Examples of GPU 842 perform calculations related to 3D computer graphics, include 2D acceleration and framebuffer capabilities, accelerate memory-intensive work of texture mapping and rendering polygons, accelerate geometric calculations such as the rotation and translation of vertices into different coordinate systems, support programmable shaders that manipulate vertices and textures, perform oversampling and interpolation techniques to reduce aliasing, and/or support very high-precision color spaces.

In examples, NPU 844 (also referred to as an "artificial intelligence (AI) accelerator" or "deep learning processor (DLP)") is a processor or processing unit configured to accelerate artificial intelligence and machine learning applications, such as execution of machine learning (ML) model (MLM) 828. In an example, NPU 844 is configured for a data-driven parallel computing and is highly efficient at processing massive multimedia data such as videos and images and processing data for neural networks. NPU 844 is configured for efficient handling of AI-related tasks, such as speech recognition, background blurring in video calls, photo or video editing processes like object detection, etc.

In embodiments disclosed herein that implement ML models, NPU 844 can be utilized to execute such ML models, of which MLM 828 is an example. For instance, where applicable, MLM 828 is a generative AI model that generates content that is complex, coherent, and/or original. For instance, a generative AI model can create sophisticated sentences, lists, ranges, tables of data, images, essays, and/or the like. An example of a generative AI model is a language model. A language model is a model that estimates the probability of a token or sequence of tokens occurring in a longer sequence of tokens. In this context, a "token" is an atomic unit that the model is training on and making predictions on. Examples of a token include, but are not limited to, a word, a character (e.g., an alphanumeric character, a blank space, a symbol, etc.), a sub-word (e.g., a root word, a prefix, or a suffix). In other types of models (e.g., image based models) a token may represent another kind of atomic unit (e.g., a subset of an image). Examples of language models applicable to embodiments herein include large language models (LLMs), text-to-image AI image generation systems, text-to-video AI generation systems, etc. A large language model (LLM) is a language model that has a high number of model parameters. In examples, an LLM has millions, billions, trillions, or even greater numbers of model parameters. Model parameters of an LLM are the weights and biases the model learns during training. Some implementations of LLMs are transformer-based LLMs (e.g., the family of generative pre-trained transformer (GPT) models). A transformer is a neural network architecture that relies on self-attention mechanisms to transform a sequence of input embeddings into a sequence of output embeddings (e.g., without relying on convolutions or recurrent neural networks).

In further examples, NPU 844 is used to train MLM 828. To train MLM 828, training data is that includes input features (attributes) and their corresponding output labels/target values (e.g., for supervised learning) is collected. A training algorithm is a computational procedure that is used so that MLM 828 learns from the training data. Parameters/weights are internal settings of MLM 828 that are adjusted during training by the training algorithm to reduce a difference between predictions by MLM 828 and actual outcomes (e.g., output labels). In some examples, MLM 828 is set with initial values for the parameters/weights. A loss function measures a dissimilarity between predictions by MLM 828 and the target values, and the parameters/weights of MLM 828 are adjusted to minimize the loss function. The parameters/weights are iteratively adjusted by an optimization technique, such as gradient descent. In this manner, MLM 828 is generated through training by NPU 844 to be used to generate inferences based on received input feature sets for particular applications. MLM 828 is generated as a computer program or other type of algorithm configured to generate an output (e.g., a classification, a prediction/inference) based on received input features, and is stored in the form of a file or other data structure.

In examples, such training of MLM 828 by NPU 844 is supervised or unsupervised. According to supervised learning, input objects (e.g., a vector of predictor variables) and a desired output value (e.g., a human-labeled supervisory signal) train MLM 828. The training data is processed, building a function that maps new data on expected output values. Example algorithms usable by NPU 844 to perform supervised training of MLM 828 in particular implementations include support-vector machines, linear regression, logistic regression, Naïve Bayes, linear discriminant analysis, decision trees, K-nearest neighbor algorithm, neural networks, and similarity learning.

In an example of supervised learning where MLM 828 is an LLM, MLM 828 can be trained by exposing the LLM to (e.g., large amounts of) text (e.g., predetermined datasets, books, articles, text-based conversations, webpages, transcriptions, forum entries, and/or any other form of text and/or combinations thereof). In examples, training data is provided from a database, from the Internet, from a system, and/or the like. Furthermore, an LLM can be fine-tuned using Reinforcement Learning with Human Feedback (RLHF), where the LLM is provided the same input twice and provides two different outputs and a user ranks which output is preferred. In this context, the user's ranking is utilized to improve the model. Further still, in example embodiments, an LLM is trained to perform in various styles, e.g., as a completion model (a model that is provided a few words or tokens and generates words or tokens to follow the input), as a conversation model (a model that provides an answer or other type of response to a conversation-style prompt), as a combination of a completion and conversation model, or as another type of LLM model.

According to unsupervised learning, MLM 828 is trained to learn patterns from unlabeled data. For instance, in embodiments where MLM 828 implements unsupervised learning techniques, MLM 828 identifies one or more classifications or clusters to which an input belongs. During a training phase of MLM 828 according to unsupervised learning, MLM 828 tries to mimic the provided training data and uses the error in its mimicked output to correct itself (i.e., correct weights and biases). In further examples, NPU 844 perform unsupervised training of MLM 828 according to one or more alternative techniques, such as Hopfield learning rule, Boltzmann learning rule, Contrastive Divergence, Wake Sleep, Variational Inference, Maximum Likelihood, Maximum A Posteriori, Gibbs Sampling, and backpropagating reconstruction errors or hidden state reparameterizations.

Note that NPU 844 need not necessarily be present in all ML model embodiments. In embodiments where ML models are present, any one or more of processor 810, GPU 842, and/or NPU 844 can be present to train and/or execute MLM 828.

One or more wireless modems 860 can be coupled to antenna(s) (not shown) of computing device 802 and can support two-way communications between processor 810 and devices external to computing device 802 through network 804, as would be understood to persons skilled in the relevant art(s). Wireless modem 860 is shown generically and can include a cellular modem 866 for communicating with one or more cellular networks, such as a GSM network for data and voice communications within a single cellular network, between cellular networks, or between the mobile device and a public switched telephone network (PSTN). In examples, wireless modem 860 also or alternatively includes other radio-based modem types, such as a Bluetooth modem 864 (also referred to as a "Bluetooth device") and/or Wi-Fi modem 862 (also referred to as an "wireless adaptor"). Wi-Fi modem 862 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 864 is configured to communicate with another Bluetooth-capable device according to the Bluetooth short-range wireless technology standard(s) such as IEEE 802.15.1 and/or managed by the Bluetooth Special Interest Group (SIG).

Computing device 802 can further include power supply 882, LI receiver 884, accelerometer 886, and/or one or more wired interfaces 880. Example wired interfaces 880 include a USB port, IEEE 1394 (Fire Wire) port, a RS-232 port, an HDMI (High-Definition Multimedia Interface) port (e.g., for connection to an external display), a DisplayPort port (e.g., for connection to an external display), an audio port, and/or an Ethernet port, the purposes and functions of each of which are well known to persons skilled in the relevant art(s). Wired interface(s) 880 of computing device 802 provide for wired connections between computing device 802 and network 804, or between computing device 802 and one or more devices/peripherals when such devices/peripherals are external to computing device 802 (e.g., a pointing device, display 854, speaker 852, camera 836, physical keyboard 838, etc.). Power supply 882 is configured to supply power to each of the components of computing device 802 and receives power from a battery internal to computing device 802, and/or from a power cord plugged into a power port of computing device 802 (e.g., a USB port, an A/C power port). LI receiver 884 is useable for location determination of computing device 802 and in examples includes a satellite navigation receiver such as a Global Positioning System (GPS) receiver and/or includes other type of location determiner configured to determine location of computing device 802 based on received information (e.g., using cell tower triangulation, etc.). Accelerometer 886, when present, is configured to determine an orientation of computing device 802.

Note that the illustrated components of computing device 802 are not required or all-inclusive, and fewer or greater numbers of components can be present as would be recognized by one skilled in the art. In examples, computing device 802 includes one or more of a gyroscope, barometer, proximity sensor, ambient light sensor, digital compass, etc. In an example, processor 810 and memory 856 are co-located in a same semiconductor device package, such as being included together in an integrated circuit chip, FPGA, or system-on-chip (SOC), optionally along with further components of computing device 802.

In embodiments, computing device 802 is configured to implement any of the above-described features of flowcharts herein. Computer program logic for performing any of the operations, steps, and/or functions described herein is stored in storage 820 and executed by processor 810.

In some embodiments, server infrastructure 870 is present in computing environment 800 and is communicatively coupled with computing device 802 via network 804. Server infrastructure 870, when present, is a network-accessible server set (e.g., a cloud-based environment or platform). As shown in FIG. 8, server infrastructure 870 includes clusters 872. Each of clusters 872 comprises a group of one or more compute nodes and/or a group of one or more storage nodes. For example, as shown in FIG. 8, cluster 872 includes nodes 874. Each of nodes 874 are accessible via network 804 (e.g., in a "cloud-based" embodiment) to build, deploy, and manage applications and services. In examples, any of nodes 874 is a storage node that comprises a plurality of physical storage disks, SSDs, and/or other physical storage devices that are accessible via network 804 and are configured to store data associated with the applications and services managed by nodes 874.

Each of nodes 874, as a compute node, comprises one or more server computers, server systems, and/or computing devices. For instance, a node 874 in accordance with an embodiment includes one or more of the components of computing device 802 disclosed herein. Each of nodes 874 is configured to execute one or more software applications (or "applications") and/or services and/or manage hardware resources (e.g., processors, memory, etc.), which are utilized by users (e.g., customers) of the network-accessible server set. In examples, as shown in FIG. 8, nodes 874 includes a node 846 that includes storage 848 and/or one or more of a processor 858 (e.g., similar to processor 810, GPU 842, and/or NPU 844 of computing device 802). Storage 848 stores application programs 876 and application data 878. Processor(s) 858 operate application programs 876 which access and/or generate related application data 878. In an implementation, nodes such as node 846 of nodes 874 operate or comprise one or more virtual machines, with each virtual machine emulating a system architecture (e.g., an operating system), in an isolated manner, upon which applications such as application programs 876 are executed.

In embodiments, one or more of clusters 872 are located/co-located (e.g., housed in one or more nearby buildings with associated components such as backup power supplies, redundant data communications, environmental controls, etc.) to form a datacenter, or are arranged in other manners. Accordingly, in an embodiment, one or more of clusters 872 are included in a datacenter in a distributed collection of datacenters. In embodiments, exemplary computing environment 800 comprises part of a cloud-based platform.

In an embodiment, computing device 802 accesses application programs 876 for execution in any manner, such as by a client application and/or a browser at computing device 802.

In an example, for purposes of network (e.g., cloud) backup and data security, computing device 802 additionally and/or alternatively synchronizes copies of application programs 814 and/or application data 816 to be stored at network-based server infrastructure 870 as application programs 876 and/or application data 878. In examples, operating system 812 and/or application programs 814 include a file hosting service client configured to synchronize applications and/or data stored in storage 820 at network-based server infrastructure 870.

In some embodiments, on-premises servers 892 are present in computing environment 800 and are communicatively coupled with computing device 802 via network 804. On-premises servers 892, when present, are hosted within an organization's infrastructure and, in many cases, physically onsite of a facility of that organization. On-premises servers 892 are controlled, administered, and maintained by IT (Information Technology) personnel of the organization or an IT partner to the organization. Application data 898 can be shared by on-premises servers 892 between computing devices of the organization, including computing device 802 (when part of an organization) through a local network of the organization, and/or through further networks accessible to the organization (including the Internet). Furthermore, in examples, on-premises servers 892 serve applications such as application programs 896 to the computing devices of the organization, including computing device 802. Accordingly, in examples, on-premises servers 892 include storage 894 (which includes one or more physical storage devices such as storage disks and/or SSDs) for storage of application programs 896 and application data 898 and include a processor 890 (e.g., similar to processor 810, GPU 842, and/or NPU 844 of computing device 802) for execution of application programs 896. In some embodiments, multiple processors 890 are present for execution of application programs 896 and/or for other purposes. In further examples, computing device 802 is configured to synchronize copies of application programs 814 and/or application data 816 for backup storage at on-premises servers 892 as application programs 896 and/or application data 898.

Embodiments described herein may be implemented in one or more of computing device 802, network-based server infrastructure 870, and on-premises servers 892. For example, in some embodiments, computing device 802 is used to implement systems, clients, or devices, or components/subcomponents thereof, disclosed elsewhere herein. In other embodiments, a combination of computing device 802, network-based server infrastructure 870, and/or on-premises servers 892 is used to implement the systems, clients, or devices, or components/subcomponents thereof, disclosed elsewhere herein.

As used herein, the terms "computer program medium," "computer-readable medium," "computer-readable storage medium," and "computer-readable storage device," etc., are used to refer to physical hardware media. Examples of such physical hardware media include any hard disk, optical disk, SSD, other physical hardware media such as RAMs, ROMs, flash memory, digital video disks, zip disks, MEMs (microelectronic machine) memory, nanotechnology-based storage devices, and further types of physical/tangible hardware storage media of storage 820. Such computer-readable media and/or storage media are distinguished from and non-overlapping with communication media, propagating signals, and signals per se. Stated differently, "computer program medium," "computer-readable medium," "computer-readable storage medium," and "computer-readable storage device" do not encompass communication media, propagating signals, and signals per se. Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared, and other wireless media, as well as wired media. Embodiments are also directed to such communication media that are separate and non-overlapping with embodiments directed to computer-readable storage media.

As noted above, computer programs and modules (including application programs 814) are stored in storage 820. Such computer programs can also be received via wired interface(s) 860 and/or wireless modem(s) 860 over network 804. Such computer programs, when executed or loaded by an application, enable computing device 802 to implement features of embodiments discussed herein. Accordingly, such computer programs represent controllers of the computing device 802.

Embodiments are also directed to computer program products comprising computer code or instructions stored on any computer-readable medium or computer-readable storage medium. Such computer program products include the physical storage of storage 820 as well as further physical storage types.

IV. Additional Example Embodiments

In embodiments, a method comprises: receiving platform-agnostic source code of an application, the platform-agnostic source code comprising a first block of code associated with a first implementation-agnostic context, the implementation-agnostic context structured to cause instances of the first block of code to execute in isolation from other instances of code associated with the first implementation-agnostic context; determining a target platform to execute the application; determining a mutual exclusion implementation for the target platform; and generating, based on the determined mutual exclusion implementation, platform-specific code to execute instances of the first block of code in isolation from other instances of code associated with the first implementation-agnostic context.

In embodiments, generating platform-specific code to execute the first block of code comprises generating platform-specific code that, when executed on the target platform, causes a device of the target platform to: acquire a lock associated with the first implementation-agnostic context; execute the first block of code; and release the lock.

In embodiments, generating platform-specific code to execute the first block of code comprises generating platform-specific code that, when executed on the target platform, causes a device of the target platform to: select a first processing unit to execute the first block of code; schedule the first block of code on a queue associated with the first processing unit; and execute the first block of code on the first processing unit.

In embodiments, the first processing unit comprises a processor core of a device of the target platform.

In embodiments, generating platform-specific code to execute the first block of code comprises generating platform-specific code that, when executed on the target platform, causes a device of the target platform to: determine, at runtime, whether to execute the first block of code in a current thread of execution on a first processing unit, or to schedule the first block of code on a queue associated with a second processing unit; responsive to determining to execute the first block of code in a current thread of execution: acquire a lock associated with the implementation-agnostic context, execute the first block of code on the first processing unit, and release the lock; and responsive to determining to schedule the first block of code in a queue associated with a second processing unit: schedule the first block of code in the queue associated with the second processing unit, acquire the lock associated with the implementation-agnostic context, execute the first block of code on the second processing unit; and release the lock.

In embodiments, the method further comprises: compiling the platform-specific code using a platform-specific framework associated with the target platform; and executing the compiled platform-specific code on a device of the target platform.

In embodiments, the first implementation-agnostic context is a serialization context.

In embodiments, a system comprises: a processor; and a memory device comprising program code structured to cause the processor to: receive platform-agnostic source code of an application, the platform-agnostic source code comprising a first block of code associated with a first implementation-agnostic context, the implementation-agnostic context structured to cause instances of the first block of code to execute in isolation from other instances of code associated with the first implementation-agnostic context; determine a target platform to execute the application; determine a mutual exclusion implementation for the target platform; and generate, based on the determined mutual exclusion implementation, platform-specific code to execute instances of the first block of code in isolation from other instances of code associated with the first implementation-agnostic context.

In embodiments, to generate platform-specific code to execute the first block of code, the program code is structured to cause the processor to generate platform-specific code that, when executed on the target platform, causes a device of the target platform to: acquire a lock associated with the first implementation-agnostic context; execute the first block of code; and release the lock.

In embodiments, to generate platform-specific code to execute the first block of code, the program code is structured to cause the processor to generate platform-specific code that, when executed on the target platform, causes a device of the target platform to: select a first processing unit to execute the first block of code; schedule the first block of code on a queue associated with the first processing unit; and execute the first block of code on the first processing unit.

In embodiments, the first processing unit comprises a processor core of a device of the target platform.

In embodiments, to generate platform-specific code to execute the first block of code, the program code is structured to cause the processor to generate platform-specific code that, when executed on the target platform, causes a device of the target platform to: determine, at runtime, whether to execute the first block of code in a current thread of execution on a first processing unit, or to schedule the first block of code on a queue associated with a second processing unit; responsive to determining to execute the first block of code in a current thread of execution: acquire a lock associated with the implementation-agnostic context, execute the first block of code on the first processing unit, and release the lock; and responsive to determining to schedule the first block of code in a queue associated with a second processing unit: schedule the first block of code in the queue associated with the second processing unit, acquire the lock associated with the implementation-agnostic context, execute the first block of code on the second processing unit; and release the lock.

In embodiments, the program code is structured to further cause the processor to: compile the platform-specific code using a platform-specific framework associated with the target platform; and execute the compiled platform-specific code on a device of the target platform.

In embodiments, the first implementation-agnostic context is a serialization context.

In embodiments, a computer-readable storage medium comprises executable instructions that, when executed by a processor, cause the processor to: receive platform-agnostic source code of an application, the platform-agnostic source code comprising a first block of code associated with a first implementation-agnostic context, the implementation-agnostic context structured to cause instances of the first block of code to execute in isolation from other instances of code associated with the first implementation-agnostic context; determine a target platform to execute the application; determine a mutual exclusion implementation for the target platform; and generate, based on the determined mutual exclusion implementation, platform-specific code to execute instances of the first block of code in isolation from other instances of code associated with the first implementation-agnostic context.

In embodiments, to generate platform-specific code to execute the first block of code, the executable instructions, when executed by the processor, cause the processor to generate platform-specific code that, when executed on the target platform, causes a device of the target platform to: acquire a lock associated with the first implementation-agnostic context; execute the first block of code; and release the lock.

In embodiments, to generate platform-specific code to execute the first block of code, the executable instructions, when executed by the processor, cause the processor to generate platform-specific code that, when executed on the target platform, causes a device of the target platform to: select a first processing unit to execute the first block of code; schedule the first block of code on a queue associated with the first processing unit; and execute the first block of code on the first processing unit.

In embodiments, the first processing unit comprises a processor core of a device of the target platform.

In embodiments, to generate platform-specific code to execute the first block of code, the executable instructions, when executed by the processor, cause the processor to generate platform-specific code that, when executed on the target platform, causes a device of the target platform to: determine, at runtime, whether to execute the first block of code in a current thread of execution on a first processing unit, or to schedule the first block of code on a queue associated with a second processing unit; responsive to determining to execute the first block of code in a current thread of execution: acquire a lock associated with the implementation-agnostic context, execute the first block of code on the first processing unit, and release the lock; and responsive to determining to schedule the first block of code in a queue associated with a second processing unit: schedule the first block of code in the queue associated with the second processing unit, acquire the lock associated with the implementation-agnostic context, execute the first block of code on the second processing unit; and release the lock.

In embodiments, the executable instructions, when executed by the processor, further cause the processor to: compile the platform-specific code using a platform-specific framework associated with the target platform; and execute the compiled platform-specific code on a device of the target platform.

V. CONCLUSION

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Furthermore, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

While various embodiments of the present disclosure have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method comprising:

receiving platform-agnostic source code of an application, the platform-agnostic source code comprising a first block of code associated with a first implementation-agnostic context, the first implementation-agnostic context structured to cause instances of the first block of code to execute in isolation from other instances of code associated with the first implementation-agnostic context;

determining a target platform to execute the application;

determining a mutual exclusion implementation for the target platform;

generating, based on the determined mutual exclusion implementation, platform-specific code to execute instances of the first block of code in isolation from other instances of code associated with the first implementation-agnostic context; and executing the first block of code.

2. The method of claim 1, wherein said generating platform-specific code to execute the first block of code comprises:

generating platform-specific code that, when executed on the target platform, causes a device of the target platform to:

acquire a lock associated with the first implementation-agnostic context; and in response to executing the first block of code, release the lock.

3. The method of claim 1, wherein said generating platform-specific code to execute the first block of code comprises:

generating platform-specific code that, when executed on the target platform, causes a device of the target platform to:

select a first processing unit to execute the first block of code;

schedule the first block of code on a queue associated with the first processing unit; and execute the first block of code on the first processing unit.

4. The method of claim 3, wherein the first processing unit comprises a processor core of a device of the target platform.

5. The method of claim 1, wherein said generating platform-specific code to execute the first block of code comprises:

generating platform-specific code that, when executed on the target platform, causes a device of the target platform to:

determine, at runtime, whether to execute the first block of code in a current thread of execution on a first processing unit, or to schedule the first block of code on a queue associated with a second processing unit;

responsive to determining to execute the first block of code in a current thread of execution:

acquire a lock associated with the first implementation-agnostic context, execute the first block of code on the first processing unit, and release the lock; and responsive to determining to schedule the first block of code in a queue associated with a second processing unit:

schedule the first block of code in the queue associated with the second processing unit, acquire the lock associated with the first implementation-agnostic context, execute the first block of code on the second processing unit; and release the lock.

6. The method of claim 1, further comprising:

compiling the platform-specific code using a platform-specific framework associated with the target platform; and executing the compiled platform-specific code on a device of the target platform.

7. The method of claim 1, wherein the first implementation-agnostic context is a serialization context.

8. A system comprising:

a processor; and a memory device comprising program code structured to cause the processor to:

receive platform-agnostic source code of an application, the platform-agnostic source code comprising a first block of code associated with a first implementation-agnostic context, the first implementation-agnostic context structured to cause instances of the first block of code to execute in isolation from other instances of code associated with the first implementation-agnostic context;

determine a target platform to execute the application;

determine a mutual exclusion implementation for the target platform;

generate, based on the determined mutual exclusion implementation, platform-specific code to execute instances of the first block of code in isolation from other instances of code associated with the first implementation-agnostic context; and execute the first block of code.

9. The system of claim 8, wherein, to generate platform-specific code to execute the first block of code, the program code is structured to cause the processor to:

generate platform-specific code that, when executed on the target platform, causes a device of the target platform to:

acquire a lock associated with the first implementation-agnostic context;

in response to executing the first block of code, release the lock.

10. The system of claim 8, wherein, to generate platform-specific code to execute the first block of code, the program code is structured to cause the processor to:

generate platform-specific code that, when executed on the target platform, causes a device of the target platform to:

select a first processing unit to execute the first block of code;

schedule the first block of code on a queue associated with the first processing unit; and execute the first block of code on the first processing unit.

11. The system of claim 10, wherein the first processing unit comprises a processor core of a device of the target platform.

12. The system of claim 8, wherein, to generate platform-specific code to execute the first block of code, the program code is structured to cause the processor to:

generate platform-specific code that, when executed on the target platform, causes a device of the target platform to:

determine, at runtime, whether to execute the first block of code in a current thread of execution on a first processing unit, or to schedule the first block of code on a queue associated with a second processing unit;

responsive to determining to execute the first block of code in a current thread of execution:

acquire a lock associated with the implementation-agnostic context, execute the first block of code on the first processing unit, and release the lock; and responsive to determining to schedule the first block of code in a queue associated with a second processing unit:

schedule the first block of code in the queue associated with the second processing unit, acquire the lock associated with the implementation-agnostic context, execute the first block of code on the second processing unit; and release the lock.

13. The system of claim 8, wherein the program code is structured to further cause the processor to:

compile the platform-specific code using a platform-specific framework associated with the target platform; and execute the compiled platform-specific code on a device of the target platform.

14. The system of claim 8, wherein the first implementation-agnostic context is a serialization context.

15. A computer-readable storage medium comprising executable instructions that, when executed by a processor, cause the processor to:

receive platform-agnostic source code of an application, the platform-agnostic source code comprising a first block of code associated with a first implementation-agnostic context, the first implementation-agnostic context structured to cause instances of the first block of code to execute in isolation from other instances of code associated with the first implementation-agnostic context;

determine a target platform to execute the application;

determine a mutual exclusion implementation for the target platform;

generate, based on the determined mutual exclusion implementation, platform-specific code to execute instances of the first block of code in isolation from other instances of code associated with the first implementation-agnostic context; and execute the first block of code.

16. The computer-readable storage medium of claim 15, wherein, to generate platform-specific code to execute the first block of code, the executable instructions, when executed by the processor, cause the processor to:

generate platform-specific code that, when executed on the target platform, causes a device of the target platform to:

acquire a lock associated with the first implementation-agnostic context;

in response to executie the first block of code, release the lock.

17. The computer-readable storage medium of claim 15, wherein, to generate platform-specific code to execute the first block of code, the executable instructions, when executed by the processor, cause the processor to:

generate platform-specific code that, when executed on the target platform, causes a device of the target platform to:

select a first processing unit to execute the first block of code;

schedule the first block of code on a queue associated with the first processing unit; and execute the first block of code on the first processing unit.

18. The computer-readable storage medium of claim 15, wherein the first processing unit comprises a processor core of a device of the target platform.

19. The computer-readable storage medium of claim 15, wherein, to generate platform-specific code to execute the first block of code, the executable instructions, when executed by the processor, cause the processor to:

generate platform-specific code that, when executed on the target platform, causes a device of the target platform to:

determine, at runtime, whether to execute the first block of code in a current thread of execution on a first processing unit, or to schedule the first block of code on a queue associated with a second processing unit;

responsive to determining to execute the first block of code in a current thread of execution:

acquire a lock associated with the implementation-agnostic context, execute the first block of code on the first processing unit, and release the lock; and responsive to determining to schedule the first block of code in a queue associated with a second processing unit:

schedule the first block of code in the queue associated with the second processing unit, acquire the lock associated with the implementation-agnostic context, execute the first block of code on the second processing unit; and release the lock.

20. The computer-readable storage medium of claim 15, wherein the executable instructions, when executed by the processor, cause the processor to:

compile the platform-specific code using a platform-specific framework associated with the target platform; and execute the compiled platform-specific code on a device of the target platform.

* * * * *